United States Patent [19]

Koren et al.

[11] Patent Number: 5,065,640
[45] Date of Patent: Nov. 19, 1991

[54] INFLATABLE STRUCTURE

[75] Inventors: Yoram Koren, Ann Arbor, Mich.; Yechiel Weinstein, Misgav, Israel

[73] Assignee: The Regents of the University of Michigan, Ann Arbor, Mich.

[21] Appl. No.: 549,963

[22] Filed: Jul. 9, 1990

[51] Int. Cl.⁵ .................... G05G 1/00; G05G 11/00
[52] U.S. Cl. ...................... 74/469; 52/221; 52/222; 74/479; 901/22; 901/27
[58] Field of Search .......... 52/2 H, 2 I, 2 J, 2 K, 52/2 L; 74/469, 479; 212/187, 266; 244/161; 414/728; 901/22, 27

[56] References Cited

U.S. PATENT DOCUMENTS

| | | | |
|---|---|---|---|
| Re. 28,663 | 12/1975 | Baer | 294/99 R |
| 2,765,014 | 10/1956 | Müller | 52/2 K |
| 3,347,587 | 10/1967 | Frost | 294/87 |
| 3,574,386 | 4/1971 | Frost | 294/87 |
| 3,601,442 | 8/1971 | Orndorff | 294/99 |
| 3,606,719 | 9/1971 | Berry | 52/2 L X |
| 3,640,564 | 2/1972 | Kuster | 294/99 R |
| 3,713,684 | 1/1973 | Ewing | 294/99 R |
| 3,716,264 | 2/1973 | Pearne et al. | 294/63 A |
| 3,913,307 | 10/1975 | Cardinal, Jr. | 56/328 R |
| 3,929,242 | 12/1975 | Sawyer | 214/390 |
| 3,945,486 | 3/1976 | Cooper | 198/179 |
| 3,981,528 | 9/1976 | Andorf et al. | 294/99 R |
| 4,030,698 | 6/1977 | Hansen | 254/106 |
| 4,109,480 | 8/1978 | Sumner | 61/114 |
| 4,273,505 | 6/1981 | Clark et al. | 414/735 |
| 4,575,297 | 3/1986 | Richter | 414/5 |
| 4,664,114 | 5/1987 | Ghodsian | 128/344 |
| 4,751,868 | 6/1988 | Paynter | 92/48 |
| 4,770,456 | 9/1988 | Phillips et al. | 294/93 |
| 4,775,362 | 10/1988 | Kronner | 604/96 |
| 4,784,042 | 11/1988 | Paynter | 91/534 |
| 4,806,066 | 2/1989 | Rhodes et al. | 74/469 X |
| 4,815,782 | 3/1989 | Craig et al. | 294/119.3 |

Primary Examiner—Allan D. Herrmann
Assistant Examiner—David W. Laub
Attorney, Agent, or Firm—Oblon, Spivak, McClelland, Maier & Neustadt

[57] ABSTRACT

An inflatable structure, particularly adapted for use in outer space, employs one or more inflatable links which are connected at a base of the structure. A distal end of an outer most link is provided with a gripper assembly which can be remote controlled, and suitable encoders are included to indicate the angular position of each of the links. The motors for driving the at least one link is situated at the base to thereby reduce the mass of the at least one link and correspondingly reduce moments of inertia during operation.

15 Claims, 5 Drawing Sheets

INFLATABLE STRUCTURE

BACKGROUND OF THE INVENTION

1. Field of the Invention

The present invention generally relates to an inflatable structure, and more particularly, to an inflatable robotic arm for use in low gravity and weightless environments which provides a low volume, low weight transportation alternative to conventional rigid robot arms.

2. Background

The use of robotic systems in outer space provides an extension of man's capabilities while decreasing the potential risks and hazards encountered in the hostile environment of space. One particular example of such robotic systems is the manipulator arm used by NASA on the Space Shuttle.

A constraint on the use of robotic systems in outer space is the high cost of transportation to the intended site of use resulting from the relatively large and heavy conventional manipulator arms and motors currently employed. Additionally, the overall size of the conventional manipulator is further prohibited thereby constraining the availability of such devices for use in outer space.

Robotic devices have been disclosed which have members which are inflatable to form rigid or semi-rigid structures, such as described in U.S. Pat. Nos. Re. 28,663, 3,347,587, 3,574,386, 3,601,442, 3,713,685, 3,716,264, 3,913,307, 3,945,486, 3,981,528, 4,751,868, 4,784,042, and 4,815,782. However, none of these robotic devices make any provision for controlling movement of the inflated rigid structure using a motor positioned at a base so as to provide a lightweight inflatable robot arm having a low moment of inertia.

Therefore, one object of the present invention is to provide an inflatable rigid structure for use as a robotic arm which has a low moment of inertia so that the length of the robotic arm can be increased as desired without compromising the structural rigidity of the inflated rigid structure.

Another object of the present invention is to provide an inflatable structure having low inertia employing a driving arrangement which permits the use of small lightweight motors to reduce the overall weight of the structure.

Still a further object of the present invention is to provide an inflatable rigid structure for use as a robotic arm having a driving arrangement for manipulating the inflated structure which is positioned so as to further reduce the moment of inertia of the robotic arm of the inflatable rigid structure.

A further object of the present invention is to provide an inflatable structure for use as a robotic system in outer space which dramatically reduces transportation costs involved in delivering the structure to the intended site of use.

Yet a further object of the present invention is to provide an inflatable structure for use in outer space which is relatively lightweight and compact during transportation in a deflated state and provides the capabilities of a conventional manipulator arm when inflated.

Still another object of the present invention is to provide an inflatable structure providing a substantial payload/machinery weight ratio to provide profound cost savings for space-based applications.

These and other objects, advantages and features of the present invention are achieved, according to one embodiment of the present invention, by an inflatable structure comprising an elongated link formed of a flexible fluidtight material and defining at least one fluidtight chamber. The material of the link has sufficient strength to remain fluidtight when the at least one chamber is inflated with a fluid to a pressure sufficient to rigidize the link. The inflated elongated link is pivotally connected at a base at which a drive arrangement is provided such that a position of the link can be controlled when the link is inflated. Additionally, a controllable manipulator or the like can be positioned at an outer end of the inflated elongated link.

According to a further embodiment of the present invention, an inflatable articulated structure is provided having at least two elongated links, each of the links being formed of a flexible fluidtight material and each defining at least one fluidtight chamber. The two elongated links are pivotally connected by a pivot joint arrangement and a drive arrangement is provided such that a position of the links can be controlled with respect to one another when both links are inflated. As with the single link arrangement, the articulated structure of this embodiment has the drive arrangement for controlling the position of the articulated links provided at the base of the structure to thereby reduce the overall moment of inertia of the articulated links and permit the use of small, lightweight motors.

One particular advantage provided by the inflatable structure of the present invention is the ability to deflate the elongated link of the structure thereby reducing the overall size and volume of the structure during transport into outer space.

Additionally, the utilization of a low inertia and lightweight inflatable link permits the use of smaller motors than used by conventional heavy, rigid manipulator arms, thereby further reducing both the weight and cost of the structure while providing the same advantages of conventional manipulator arms. Moreover, by positioning the various drive motors employed to drive the link at the base of the structure, the moment of inertia of the link is further reduced thereby decreasing the amount of force needed to start and stop the link as required.

A further advantage of the present invention is provided by the substantial increase in the payload/machinery weight ratio which is on the order of ten-fold or more as compared to conventional rigid robot arrangements currently available.

One particular feature of preferred embodiments of the present invention is that the link can be inflated with a fluid, for example, with air, to pressures sufficient to provide the required stiffness, for example, between 10 psi to 50 psi or more, in order to provide the requisite stiffness of the link. Additionally, fluids other than air can be employed to inflate the link, including, such as, for example, liquids, helium or gases produced by gas generators of any kind.

The fluidtight chamber of the link can be further divided into a plurality of individual cells such that when one cell is deflated or damaged, the rigidity of the link is still maintained. Further, self-repairing or self-sealing materials can be employed to form the link to prevent or reduce leakage of fluid from a damaged link.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
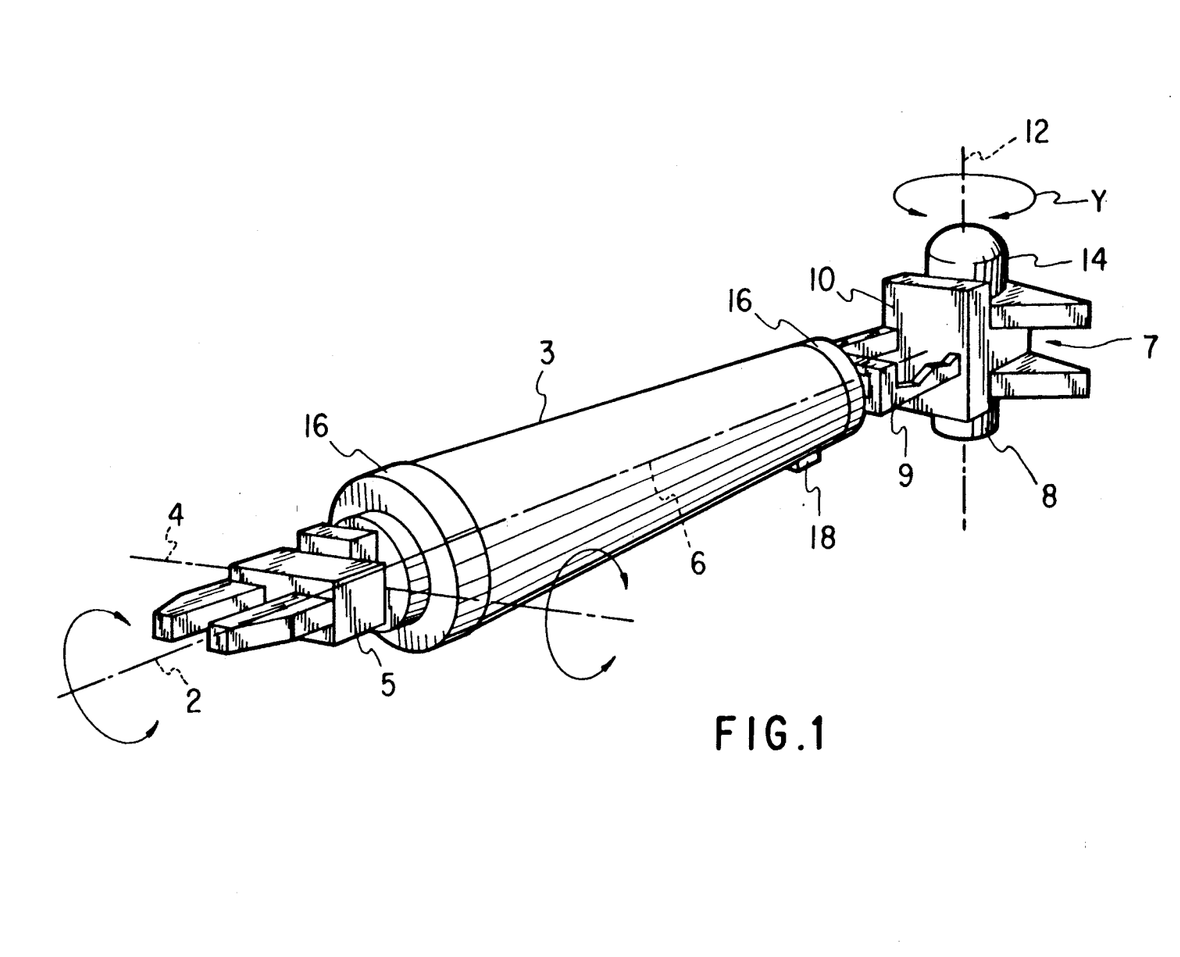
FIG. 1 is a perspective view of one embodiment of the inflatable structure of the present invention illustrated in an inflated state.

Various other objects, features and attendant advantages of the present invention will be more fully appreciated as the same becomes better understood from the following detailed description when considered in connection with the accompanying drawings in which reference characters designate like or corresponding parts throughout the several views and wherein:

Referring to FIG. 1, one embodiment of the inflatable structure, generally indicated at 1, is shown in the inflated state. The structure 1 comprises an inflatable link 3 which is a substantially cylindrical inflatable structure having, for example, a length of 1 meter. A motorized gripper assembly 5 is provided at a distal end of the link 3, the gripper assembly 5 having substantially orthogonal first and second axes of rotation 2, 4, respectively.

The motorized gripper assembly 5 is connected by suitable optical or electrical control lines 6 to a base, generally indicated at 7, of the inflatable articulated structure 1. The optical or electrical control lines 6 provide command signals from the base 7 to the motorized gripper assembly 5 positioned at the distal end of the link 3 to control the movement and actuation of the gripper assembly 5. The optical or electrical control lines 6 can be situated at an interior of the link 3 or alternatively can be formed exterior to or at the surface of the link 3.

The base 7 of the inflatable articulated structure 1 is a rigid structure and is pivotal movable by a bi-directional link motor 8. Preferably, the link 3 has one end rigidly attached by an attachment structure 9 to, for example, a face plate 10 of the base 7. The bi-directional link motor 8 has an output shaft (not shown) attached, for example, to the face plate 10 of the base 7 which has an axis of rotation 12 to permit controlled pivotal movement of the link 3 in either direction as indicated by arrows Y. Also included is a link encoder 14, for example, an angular position shaft encoder, which provides information regarding the current angular positions of the output shaft of the link motor 8 to generate link positioning control information indicating a current position of the link 3.

The link 3 preferably comprises a cylindrical inflatable structure made of a thin film material, forming at least one fluidtight chamber, and inflated with a fluid, such as for example, liquids, air, helium or a gas generated by a gas generator of any kind. The thin film material used to form the link 3 comprises, for example, a multi-layer, high strength, low-weight material such as kevlar, carbon fibers, nylon, etc. and a coating or another layer of an elastomers, such as rubber, to make the material fluidtight.

Figure 5:
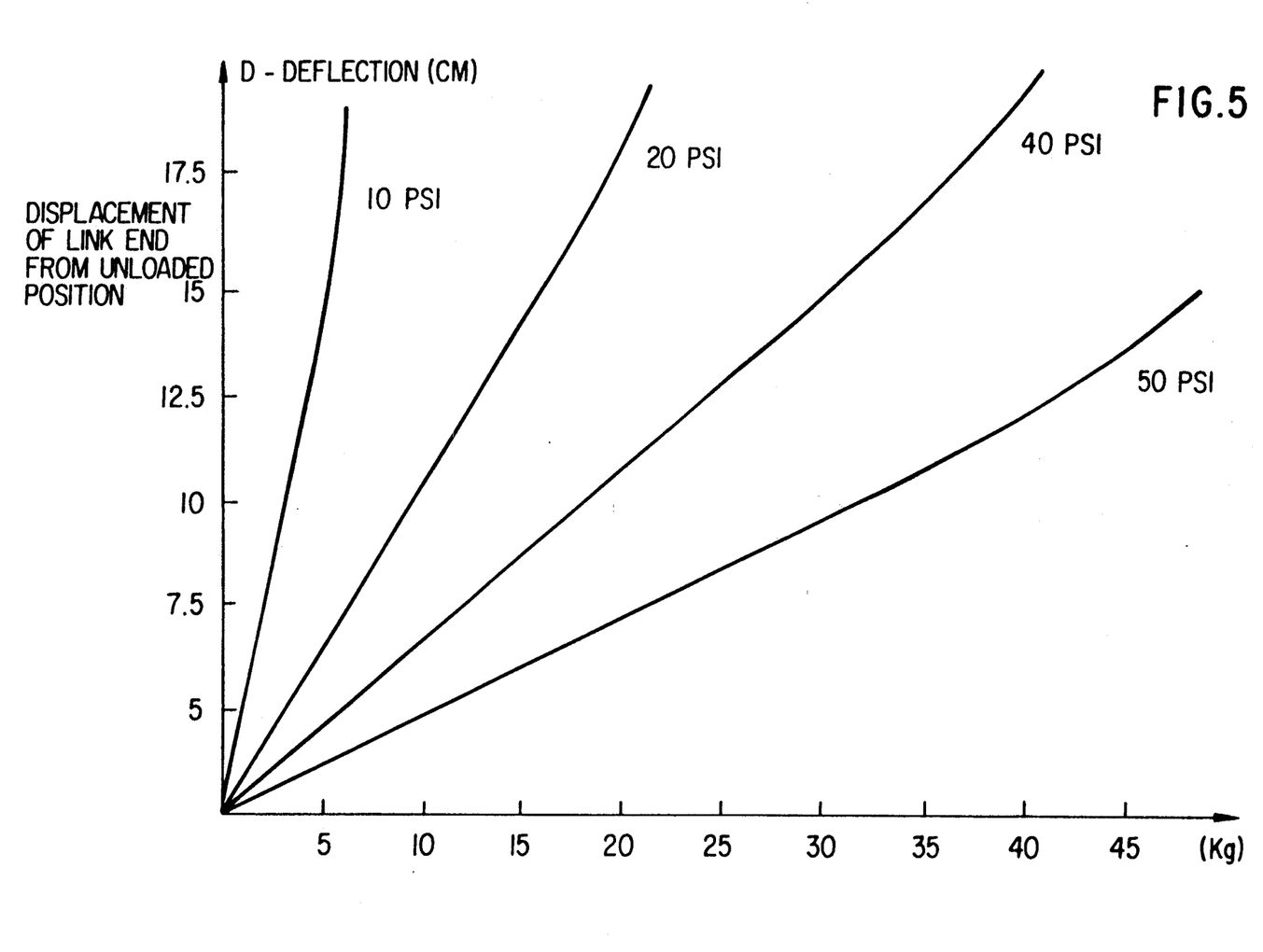
FIG. 5 is graphic representation of measurement results of the deflection of an inflated single link relative to payload weight at the end of the link.

The link 3 is provided with rigid ends or caps 16 and with a two-way valve 18 to permit inflation and deflation of the link 3, by means of, for example, a remote pressure source (not shown) or remotely actuated gas generators located at the link 3. The link 3 is preferably inflated to pressures between about 10 psi to 50 psi or more and has been tested with payloads in the range of 0 to 40 kg as shown in FIG. 5.

Figure 2:
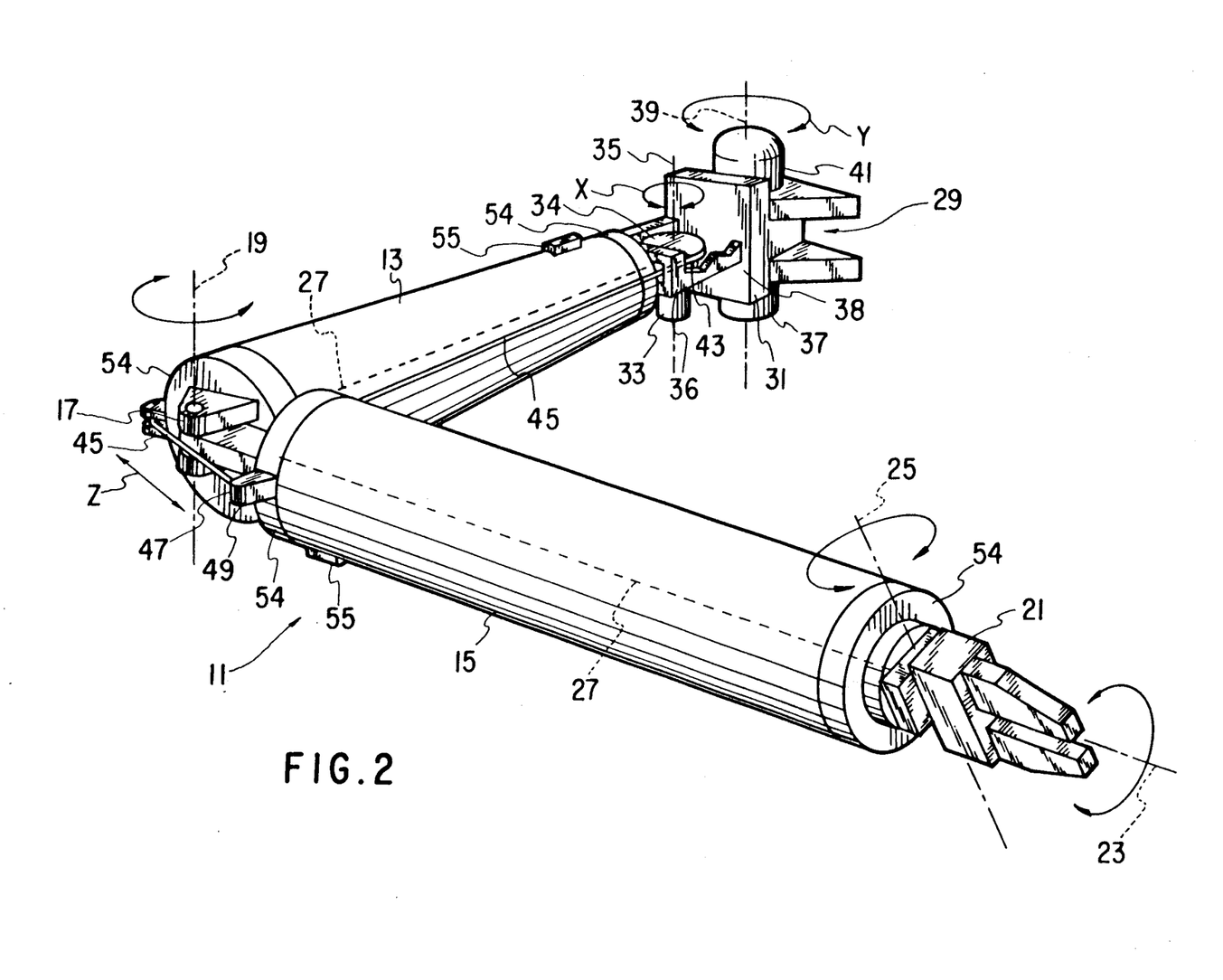
FIG. 2 is a perspective view of an embodiment of the inflatable articulated structure of the present invention illustrated in an inflated state.

Referring to FIG. 2, an embodiment of an inflatable articulated structure of the present invention, generally indicated at 11, is shown in the inflated state. The structure 11 comprises at least two inflatable links including an inner link 13 and an outer link 15; however, in accordance with the present invention, any number of inflatable links can be employed.

Each link 13, 15 is a substantially cylindrical inflatable structure having, for example, a length of 1 meter. The inner and outer links 13, 15 are connected by an articulated joint 17 having an axis of rotation 19 to provide the required articulation.

A motorized gripper assembly 21 is provided at a distal end of the outer link 15, the gripper assembly 21 having substantially orthogonal first and second axes of rotation 23, 25, respectively. The motorized gripper assembly 21 is connected by suitable optical or electrical control lines 27 to a base, generally indicated at 29, of the inflatable articulated structure 11. The optical or electrical control lines 27 provide command signals from the base 29 to the motorized gripper assembly 21 positioned at the distal end of the outer link 15 to control the movement and actuation of the gripper assembly 21. The optical or electrical control lines 27 can be situated at an interior of each of the inner and outer links 13, 15 or alternatively can be formed exterior to or at the surface of each of the inner and outer links 13, 15.

The base 29 of the inflatable articulated structure 11 is a rigid structure and pivotally supports a bi-directional outer link motor 31 operatively associated with an outer link drive mechanism 33 including a wheel or gear 34 which, for example, is rotatably driven by the outer link motor 31 about an axis of rotation 35 in either direction as indicated by arrows X. Preferably, the inner link 13 has one end rigidly attached by an attachment structure 36 to, for example, a face plate 38 of the outer link motor 31.

The outer link motor 31 and the inner link 13 attached thereto are pivotal moved by a bi-directional inner link motor 37 which has an output shaft (not shown) attached, for example, to a casing of the outer link motor 31 and having an axis of rotation 39 to permit controlled pivotal movement of the inner link 13 in either direction as indicated by arrows Y. Also included are inner and outer link encoders 41, 43, for example, angular position shaft encoders, which respectively provide information regarding the current angular positions of the output shaft of the inner link motor 37 and of the wheel 34 of the outer link motor 33 to generate link positioning control information indicating a current position of the inner and outer links 13, 15, respectively.

The outer link drive mechanism 33 further includes a drive belt or chain 45 having a pair of ends 47, each attached at an attachment 49 provided on either side of a proximal end of the outer link 15. The drive belt or chain 45 is looped around the wheel 34 of the outer link drive mechanism 33 so that, as the wheel 34 is rotatably driven in either direction about its associated axis of rotation 35, the ends 47 of the belt 45 is moved, as indicated by arrow Z, and the outer link 15 is pivoted about axis 19 of the joint 17 to a desired position as indicated by the outer link encoder 43.

Additionally, as the inner link motor 37 is pivotally driven about its associated axis of rotation 39, the support member 36 can be appropriately positioned such that the inner link 13 attached thereto is positioned as desired in accordance with indications provided by the inner link encoder 41. Thus, both the inner and outer links 13, 15 can be respectively pivoted about axes of rotation 39, 19 so as to position the motorized gripper assembly 21 at a desired location for use.

Each link 13, 15 preferably comprises a cylindrical inflatable structure made of a thin film material, forming at least one fluidtight chamber, and inflated with a fluid, such as for example, air, helium or a gas generated by a gas generator of any kind. The thin film material used to form the links 13, 15 comprises, for example, a multilayer, high strength, low-weight material such as kevlar, carbon fibers, nylon, etc. and a coating or another layer of an elastomers such as rubber to make the material fluidtight.

Each link 13, 15 is provided with rigid ends or caps 54 and with a two-way valve 55 to permit inflation and deflation of the links 13, 15 by means of, for example, a remote pressure source (not shown) or remotely actuated gas generators located at the respective link 13, 15. The links 13, 15 are preferably inflated to pressures between about 10 psi to 50 psi and have been tested with payloads in the range of 0 to 40 kg as shown in FIG. 5.

Referring to FIG. 5, when one of the inflatable links of the present invention is fully extended, the end-arm vertical deflection for a 10 kg load was only 5 cm at 50 psi, 7 cm at 40 psi, 11 cm for 20 psi and 14 cm for 15 psi. The deflections can be reduced by further increasing the pressure contained inside the inflatable structure which requires greater thickness of the thin film material used to form the links.

A further important feature of the present invention pertains to the positioning of the link motors at the base. This arrangement permits a reduction of the mass of the inflatable links thereby reducing the moment of inertia experienced by the structure during movement. Additionally, it permits the construction of the cylindrical inflatable structure of the links so as to have a length substantially as desired. Thus, the inflatable structures illustrated in FIGS. 1 and 2 of the present application can provide a maximum robotic reach of over 2 meters at a weight of less than about 5 kg (including attachments but not the base and motors).

Figure 3:
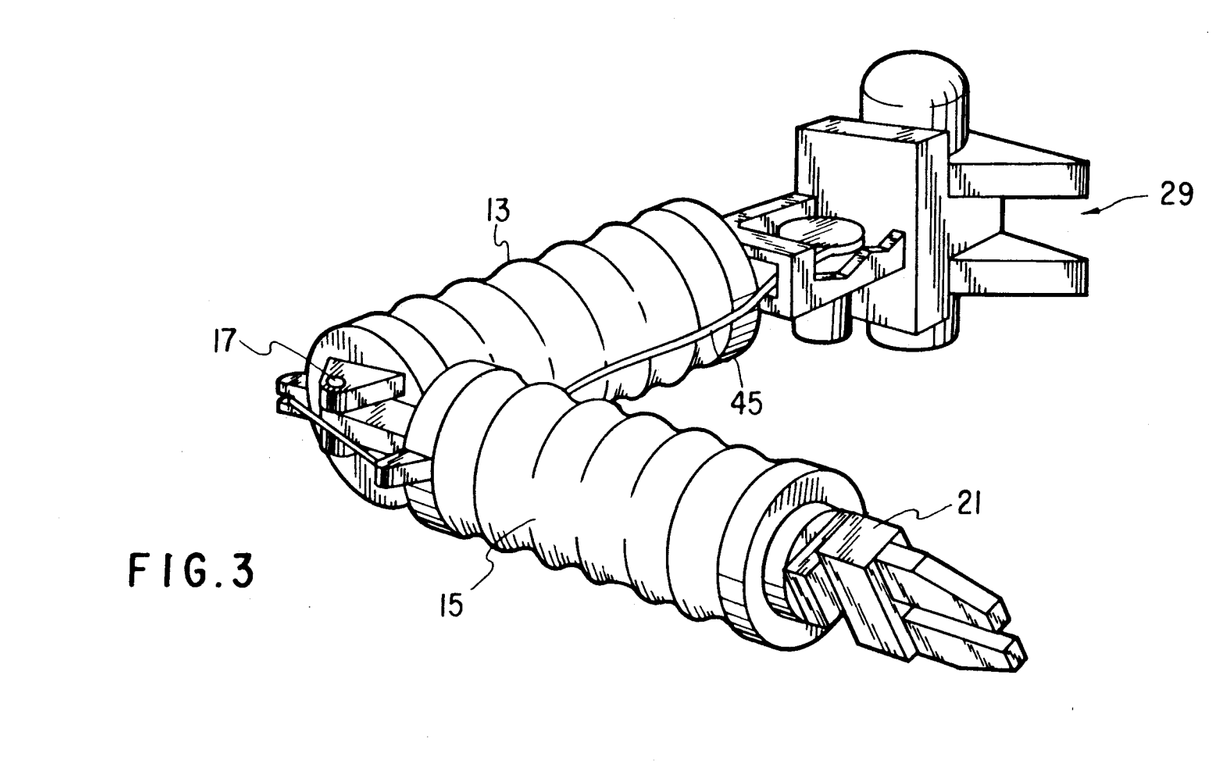
FIG. 3 is a perspective view of the embodiment of FIG. 2 shown in a partially deflated state.

Referring to FIG. 3, the inflatable articulated structure 11 of FIG. 2 is illustrated in a partially deflated state. Once fully deflated the structure 11 can be folded into a cylindrical box having a radius of about 8 cm and a height of about 30 cm. This arrangement permits a compact structure for transport into outer space.

Figure 4:
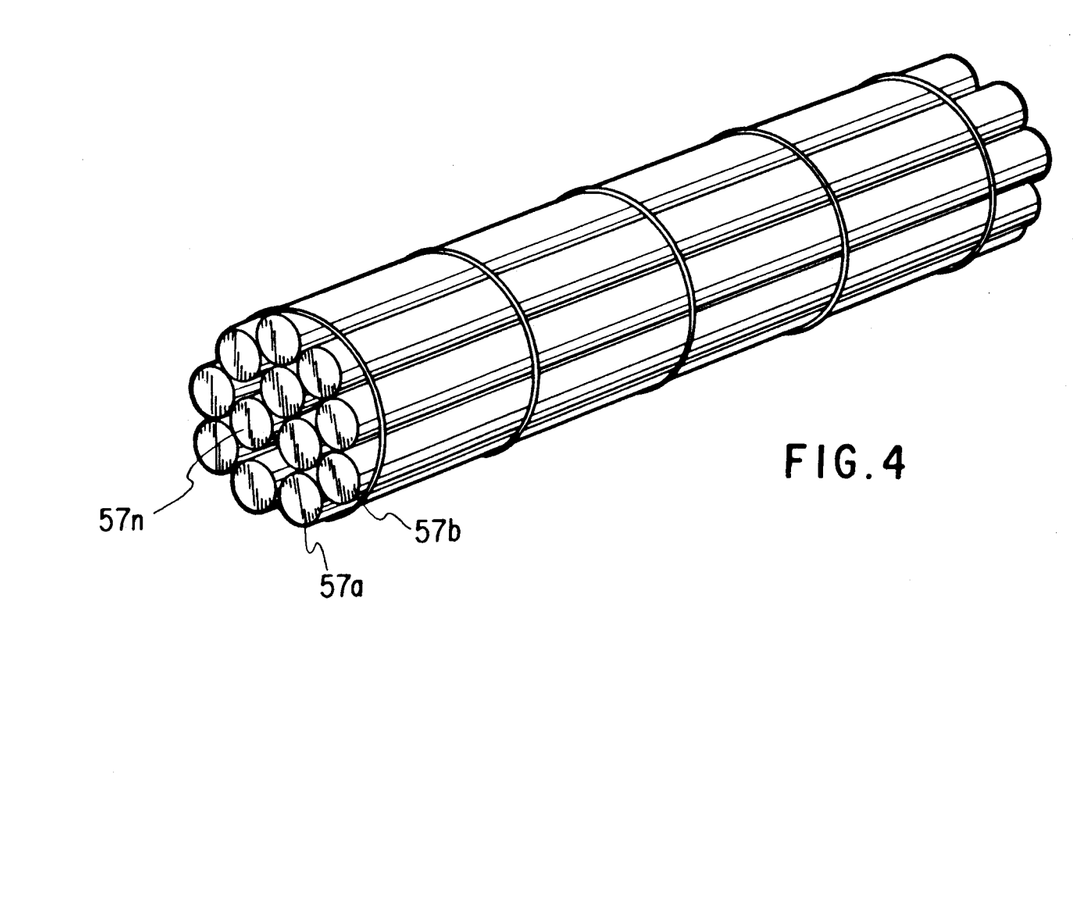
FIG. 4 is perspective view of an inflated link according to one embodiment of the present invention wherein the link is divided into a plurality of separate cells.

Referring to FIG. 4, a further embodiment of one of the inflatable links is illustrated wherein at least one of the links 13, 15 or the single link 3 is divided into a plurality of subcells 57a...57n such that even when fluid in one subcell 57 is lost, the rigidity of the link will be maintained. Additionally, self-repairing materials can be employed, such as used in self-sealing gas tanks, to provide the thin film of the link with the ability to repair small holes therein.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An inflatable structure, comprising:
   at least inner and outer elongated links, each of the links being formed of a flexible fluidtight material and each defining at least one fluidtight chamber, the material of each link having sufficient strength to remain fluidtight when the at least one chamber thereof is inflated with a fluid to a pressure sufficient that the link is rigidized by the fluid pressure of the at least one chamber;
   joint means for pivotally connecting the inner and outer links to one another;
   a base;
   means for pivotal mounting the inner link at the base;
   first drive means for pivotally driving the inner link at the base; and
   second drive means for pivotally driving the outer link about the inner link such that a position of the outer link is controlled with respect to the inner link when the links are inflated.

2. An inflatable structure according to claim 1, wherein the first and second drive means are positioned at the base and wherein the outer link is connected to the second drive means by a drive train.

3. An inflatable structure according to claim 2, wherein the drive train is one of a belt and chain having a pair of ends attached to lateral sides of a proximal end of the outer link, the one of the belt and chain being looped around a rotatable element rotatable driven by the second drive means.

4. An inflatable structure according to claim 3, wherein the second drive means has a casing, wherein the inner link is rigidly attached to the casing of the second drive means, and wherein the means for pivotal mounting the inner link at the base comprises means for pivoting the casing of the second drive means relative the base by the first drive means.

5. An inflatable structure according to claim 1, wherein the at least one fluidtight chamber is pressurized to a pressure of at least between about 10 to 50 psi.

6. An inflatable structure according to claim 1, wherein the at least one fluidtight chamber is provided with valve means for permitting inflation and deflation of the at least one fluidtight chamber.

7. An inflatable structure according to claim 1, wherein the flexible fluidtight material comprises a self-sealing material.

8. An inflatable structure according to claim 1, wherein the fluid is one of air and helium.

9. An inflatable articulated structure according to claim 1, wherein at least one of the two links defines a plurality of fluidtight chambers.

10. An inflatable structure comprising:
    an elongated link formed of a flexible fluidtight material and defining at least one fluidtight chamber, the material of the link having sufficient strength to remain fluidtight when the at least one chamber is inflated with a fluid to a pressure sufficient to rigidize the link due to the fluid pressure in the at least one chamber thereof;

a base;

pivoting means for pivotally mounting the elongated link at the base;

drive means, positioned at the base, for pivotally driving the link to control a position of the link relative to the base when the link is inflated.

11. An inflatable structure according to claim 10, wherein the at least one fluidtight chamber is pressurized to a pressure of at least between about 10 to 50 psi.

12. An inflatable structure according to claim 10, wherein the at least one fluidtight chamber is provided with valve means for permitting inflation and deflation of the at least one fluidtight chamber.

13. An inflatable structure according to claim 10, wherein the flexible fluidtight material comprises a self-sealing material.

14. An inflatable structure according to claim 10, wherein the fluid is one of air and helium.

15. An inflatable articulated structure according to claim 10, wherein the link defines a plurality of fluidtight chambers.

* * * * *

UNITED STATES PATENT AND TRADEMARK OFFICE
CERTIFICATE OF CORRECTION

PATENT NO. : 5,065,640

DATED : November 19, 1991

INVENTOR(S) : YORAM KOREN ET AL

It is certified that error appears in the above-identified patent and that said Letters Patent is hereby corrected as shown below:

In column 1, between lines 2 and 3, insert the following paragraph:

--This invention was made with Government support under Grant NAGW-1198, Subcontract No. 205400-23 awarded by NASA. The Government has certain rights in the invention.--

Signed and Sealed this

Twelfth Day of October, 1993

*Attest:*

BRUCE LEHMAN

*Attesting Officer*     *Commissioner of Patents and Trademarks*